United States Patent
Yang et al.

(10) Patent No.: US 11,891,035 B2
(45) Date of Patent: Feb. 6, 2024

(54) AUTONOMOUS EMERGENCY BRAKING (AEB) BASED ON VEHICLE TURN STATE

(71) Applicant: Aptiv Technologies AG, Schaffhausen (CH)

(72) Inventors: Zhuyong Yang, Rochester Hills, MI (US); Vidya Chidanand Mansur, Rochester Hills, MI (US); Wen-Yu Kuo, Ann Arbor, MI (US); Mingda Yang, Rochester Hills, MI (US)

(73) Assignee: Aptiv Technologies AG, Schaffhausen (CH)

(*) Notice: Subject to any disclaimer, the term of this patent is extended or adjusted under 35 U.S.C. 154(b) by 8 days.

(21) Appl. No.: 17/382,491

(22) Filed: Jul. 22, 2021

(65) Prior Publication Data

US 2023/0033316 A1 Feb. 2, 2023

(51) Int. Cl.
*B60T 7/22* (2006.01)
*B60T 8/171* (2006.01)
*B60T 8/172* (2006.01)

(52) U.S. Cl.
CPC ............... *B60T 7/22* (2013.01); *B60T 8/171* (2013.01); *B60T 8/172* (2013.01); *B60T 2201/03* (2013.01); *B60T 2210/32* (2013.01); *B60T 2220/00* (2013.01); *B60T 2250/00* (2013.01); *B60T 2250/03* (2013.01)

(58) Field of Classification Search
CPC . B60T 7/22; B60T 8/171; B60T 8/172; B60T 2201/03; B60T 2210/32; B60T 2220/00; B60T 2250/00; B60T 2250/03
See application file for complete search history.

(56) References Cited

U.S. PATENT DOCUMENTS

| 10,023,187 B2 | 7/2018 | Wulf |
| 10,074,280 B2 | 9/2018 | Bai et al. |
| 10,363,869 B2 | 7/2019 | Vincent et al. |
| 2010/0023183 A1* | 1/2010 | Huang ........... B60W 30/12 701/1 |

(Continued)

FOREIGN PATENT DOCUMENTS

| CN | 111717192 A | 9/2020 |
| EP | 1223093 A2 | 7/2002 |

(Continued)

OTHER PUBLICATIONS

"Extended European Search Report dated Dec. 16, 2022", 10 Pages.

*Primary Examiner* — Faris S Almatrahi
*Assistant Examiner* — Andrew J Cromer
(74) *Attorney, Agent, or Firm* — Billion & Armitage

(57) ABSTRACT

A method of implementing autonomous emergency braking (AEB) for advanced driver-assistance systems (ADAS), the method includes receiving one or more first inputs and identifying one or more targets external to a host vehicle based on the one or more first inputs. The method further includes receiving one or more second inputs related to a turning status of the host vehicle and detecting a U-turn state associated with the host vehicle based on the one or more second inputs. The AEB algorithm may be modified in response to the detected U-turn state, wherein the AEB algorithm initiates an AEB event as necessary to avoid collisions with the one or more identified targets.

15 Claims, 4 Drawing Sheets

(56) References Cited

U.S. PATENT DOCUMENTS

2016/0003630 A1\*  1/2016  Higuchi ................. G08G 1/167
                                                    701/41
2016/0244036 A1\*  8/2016  Ike ........................ B60T 8/3275
2018/0215378 A1    8/2018  Edo Ros

FOREIGN PATENT DOCUMENTS

EP        1223093 A3    8/2003
WO     2016195566 A1   12/2016

\* cited by examiner

AUTONOMOUS EMERGENCY BRAKING (AEB) BASED ON VEHICLE TURN STATE

FIELD

This disclosure is generally directed to advanced driver assistance systems (ADAS) and in particular to autonomous emergency braking (AEB) systems modified based on the turn status of the host vehicle.

BACKGROUND

Advanced driver assistance systems (ADAS) are capable of sensing objects/targets external to the host vehicle and to autonomously initiate vehicular actions. For example, ADAS systems are capable of detecting potential collisions with external targets and initiating autonomous emergency braking (AEB) when necessary to avoid collisions. In general, ADAS systems utilize knowledge regarding the speed of the host vehicle and position (relative to the host vehicle) of the target to determine a time-to-collision (TTC) value. In the event the TTC value reaches a threshold value, the AEB module is initiated to ensure the host vehicle does not collide with the identified target. However, based only on these parameters the ADAS system may fail to correctly interpret certain conditions, relying in an undesirable activation of the AEB module. In addition, ADAS systems may fail as a result of system uncertainty caused by sensor error, for example. It would be beneficial to develop an ADAS system and method that is capable of preventing false positives (or at least reducing them). In addition, it would be beneficial if the ADAS system and method could do so utilizing inputs already available on ADAS vehicles.

SUMMARY

According to one aspect, a method of implementing autonomous emergency braking (AEB) for advanced driver-assistance systems (ADAS) includes receiving one or more first inputs and identifying one or more targets external to a host vehicle based on the one or more first inputs. The method further includes receiving one or more second inputs related to a turning status of the host vehicle and detecting a U-turn state associated with the host vehicle based on the one or more second inputs. The AEB algorithm is modified in response to the detected U-turn state, wherein the AEB algorithm initiates an AEB event as necessary to avoid collisions with the one or more identified targets.

According to another aspect, a method of implementing autonomous emergency braking (AEB) for advanced driver-assistance systems (ADAS) includes identifying one or more targets external to a host vehicle and detecting a vehicle turn state of the host vehicle based on one or more inputs. The method may further include selecting an Autonomous Emergency Braking (AEB) algorithm to apply based on the detected vehicle turn state, wherein the AEB algorithm is utilized to initiate an AEB event to avoid collision with the identified target.

According to another aspect, an advanced driver-assistance system (ADAS) includes one or more first sensors configured to generate first inputs related to targets sensed external to a host vehicle and one or more second sensors configured to generate second inputs related to a turn state of the host vehicle. The ADAS may further include a controller configured to receive the first inputs from the one or more first sensors and the second inputs from the one or more second sensors, wherein the controller is configured to detect targets based on the first inputs received from the one or more first sensors and detects the turn state of the host vehicle based on the second inputs, wherein the controller utilizes an autonomous emergency braking (AEB) algorithm to trigger AEB events to avoid collisions with the detected targets, wherein the controller modifies the AEB algorithm based on detected turn state of the host vehicle.

DETAILED DESCRIPTION

According to some aspects, the present disclosure provides an advanced driver assist system (ADAS) that provides autonomous emergency braking (AEB). The AEB algorithm implemented by the AEB may be modified or selected based on a determined status of the vehicle. For example, a first or unmodified AEB algorithm may be utilized in normal situations in which the host vehicle is traveling relatively straight and modified in response to a determination that the host vehicle is performing a high-yaw rate turn like a U-turn. In some embodiments, one or more additional sensors already employed on advanced vehicles (such as accelerometers, steering sensors, etc.) are utilized to detect conditions corresponding with a U-turn. In response, the AEB algorithm is modified to prevent false positive events. In some embodiments, the AEB algorithm may further utilize event history of the system to distinguish between U-turns and evasive steering maneuvers characterized by the some of the same attributes (e.g., high yaw rate, high steering angle, etc.). The AEB algorithm may be selected or modified based on the determined vehicle turn state (e.g., U-turn, evasive steering, etc.).

Figure 1:
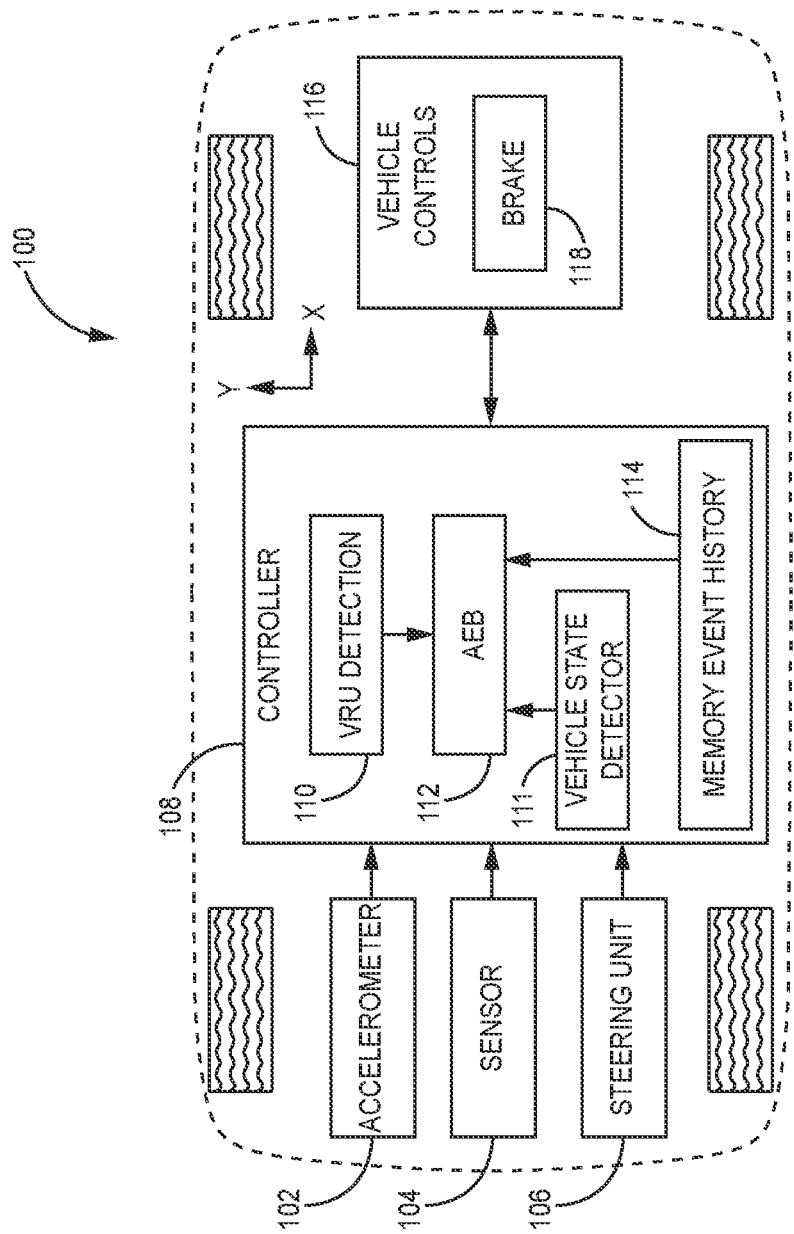
FIG. 1 is a block diagram of a vehicle including advanced driver assistance systems (ADAS) according to some embodiments.

FIG. 1 is a block diagram of a host vehicle 100 including advanced driver assistance systems (ADAS) according to some embodiments. In some embodiments, ADAS systems include one or more sensors (e.g., accelerometer 102, target detection sensors 104, steering feedback/input sensors 106), a controller 108 configured to receive inputs from the one or more sensors and utilized to detect events (e.g., collisions) requiring activation of autonomous emergency braking (AEB) systems. The controller 108 communicates autonomous driving features—such as AEB signals—to vehicle controls 116, which may include brake and/or brake activation system 118.

In some embodiments, the one or more sensors may include one or more target detection sensors 104 utilized to detect objects/targets external to the host vehicle 100. In some embodiments, this may include radar detectors, LiDAR detectors, video cameras, ultrasonic detectors, etc.

utilized to detect external targets. Sensor data collected by the target detection sensors 104 are provided to controller 108, which utilizes the received sensor data to detect external targets. In some embodiments, controller 108 includes a vulnerable road user (VRU) detector 110 that detects utilizes the receive sensor data provided by the target detector sensors 104 to detect VRUs (e.g., pedestrians, vehicles, bicyclists, or other targets expected to be located on a road. In some embodiments, VRU detector 110 utilizes the inputs received from the target detector sensor 104 to determine one or more of location of the target (e.g., lateral offset with respect to the path of the vehicle), distance to the target, speed of the target, and/or direction of travel of the target. In this way, VRU detector 110 identifies targets external to the vehicle. In some embodiments, VRU detector 110 is focused in particular on detecting vulnerable road users (VRUs), but in other embodiments may be utilized to detect other targets or objects external to the vehicle. In some embodiments, the VRU detector 110 may also utilize inputs from accelerometer 102 and/or steering input 106.

The AEB module 112 implemented by the controller 108 is utilized to determine whether the brake 118 should be automatically actuated in order to prevent a collision between the host vehicle 100 and a VRU or target detected by the VRU detector 110. In some embodiments, the AEB module 112 receives inputs from the VRU detector 110 (e.g., detected VRUs/targets, attributes of the detected VRUs/targets, including speed/direction of the detected VRUs/targets) and the vehicle state detector 111 (e.g., vehicle speed, yaw rate, steering angle, radius of curvature). In some embodiments, the AEB module 112 may also monitor an event history stored by memory 114. In general, the AEB module 112 implements an algorithm for determining whether the brake 118 should be actuated to prevent a collision between the host vehicle 100 and a detected VRU or target. For example, based on the speed of the vehicle and distance to the detected VRU/target, a time to collision (TTC) is calculated by the AEB module 112. In some embodiments, if the TTC falls below a threshold value—indicating that the host vehicle will collide with the VRU/target if no action is taken—then the AEB module 112 actuates the brake 118 to prevent the collision. In some embodiments, the AEB module 112 utilizes one or more of host vehicle speed, longitudinal range (i.e., distance to the target), time-to-collision (TTC), lateral range, lateral speed of the target (moving towards or away from the path of the host vehicle), and radius of curvature (ROC) to determine whether to initiate emergency braking.

In some embodiments, the algorithm implemented by the AEB module 112 is modified based on the status of the vehicle as detected by the vehicle state detector 111. For example, in some embodiments the algorithm implemented by the AEB module 112 is modified if the vehicle status changes from a relatively straight path to a turning. In some embodiments, the algorithm implemented by the AEB module 112 is further modified based on whether a U-turn is detected. In particular, in some embodiments the determination of whether the TTC thresholds utilized to determine whether to initiate the AEB module are modified in response to a determination that a vehicle is executing a U-turn. This modification prevents false activation of the AEB module 112. In addition, in some embodiments, the AEB module 112 further utilizes event history information stored by memory 114 to determine a vehicle state and therefore whether to modify the algorithm initiated by the AEB module 112. For example, in some embodiments the event history can be utilized to differentiate between an evasive steering event and a U-turn, wherein the algorithm utilized by the AEB module 112 is selected based on the determination. For example, a recently initiated AEB event (stored in memory 14) can be utilized to differentiate between a U-turn event (which is not preceded by an AEB event) and an evasive steering event (characterized by similar steering angles and/or accelerometer outputs), which is typically characterized by an emergency braking event in addition to evasive steering of the vehicle.

Figures 2A, 2B:
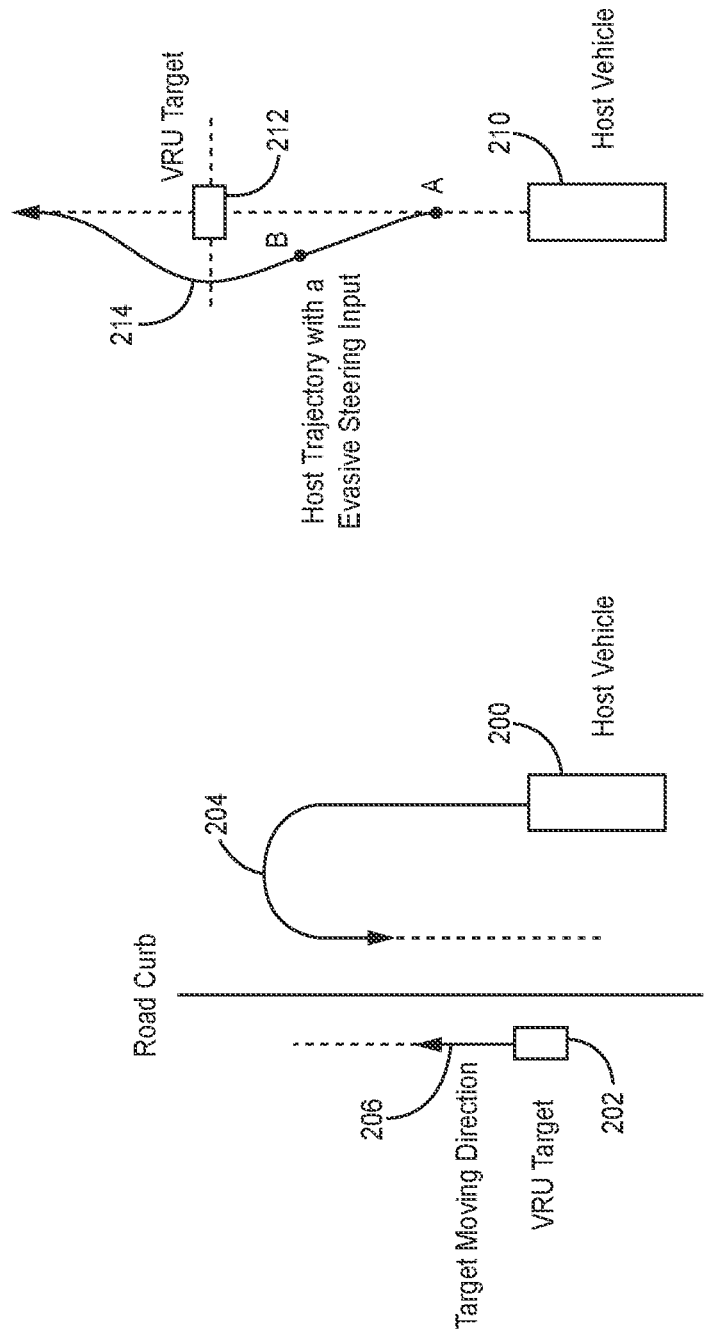
FIG. 2A is schematic illustrating a U-turn operation initiated by a host vehicle in the presence of a vulnerable road user (VRU) target.
FIG. 2B is a schematic illustrating an evasive steering maneuver initiated by a host vehicle in the presence of a VRU target.

FIG. 2A is schematic illustrating a U-turn operation initiated by a host vehicle in the presence of a vulnerable road user (VRU) target; FIG. 2B is a schematic illustrating an evasive steering maneuver initiated by a host vehicle in the presence of a VRU target. As shown in FIG. 2A, the host vehicle 200 initiates a U-turn as indicated by curve 204. A vulnerable road user (VRU) target 202 is walking in a direction indicated by arrow 206 alongside the road. In some embodiments, VRU detector 110 (shown in FIG. 1) detects VRU targets as well as the direction and speed of each VRU target. However, accurate estimate of VRU direction and speed is complicated when the host vehicle 200 is also turning/moving.

In some embodiments, the algorithm utilized by the AEB 112 (shown in FIG. 1)— if unmodified—may determine incorrectly based on the location of the VRU and the speed/direction of the host vehicle 200 that autonomous emergency braking (AEB) should be initiated to avoid a collision. According to some embodiments, the AEB algorithm utilized by the AEB module 112 is modified in response to a determination that the host vehicle 100 is initiating a U-turn. The modification of the AEB algorithm prevents false positive activation of the AEB module 112. In some embodiments, the AEB algorithm is modified to prevent false positives but remains active, such that collisions between the host vehicle 200 and the VRU target 202 are prevented. In the embodiment shown in FIG. 2A, it is desirable that the AEB module 112 not initiate autonomous emergency braking.

In contrast, in the example illustrated in FIG. 2B the host vehicle 210 (initially moving in a relatively straight line) detects VRU target 212 and at point A initiates an evasive steering maneuver—including autonomous emergency braking (AEB)—to avoid a collision with the VRU target 212. During the evasive steering maneuver illustrated by line 214 the input received from the accelerometer 102 and/or steering input 106 may appear similar to the inputs received during a U-turn event (for example, at point 'B' the yaw rates may be similar to those seen in executing a U-turn). It is important to distinguish between the situation illustrated in FIG. 2A and the situation illustrated in FIG. 2B to ensure that AEB is engaged (or remains engaged) as necessary in the situation shown in FIG. 2B.

Figure 3:
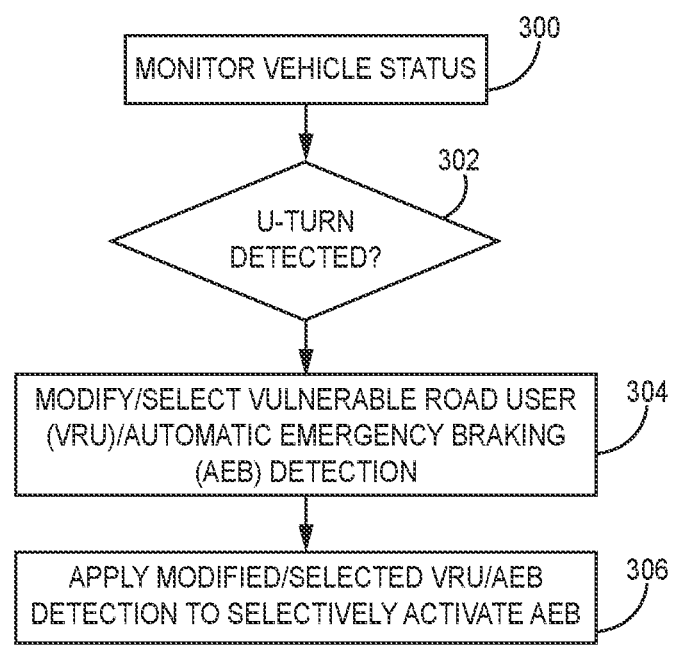
FIG. 3 is a flowchart illustrating modification of a vulnerable road user (VRU)/automatic emergency braking (AEB) algorithm in response to a detected U-turn according to some embodiments.

FIG. 3 is a flowchart illustrating modification of a vulnerable road user (VRU)/automatic emergency braking (AEB) algorithm in response to a detected U-turn according to some embodiments. In some embodiments, all steps shown in FIG. 3 are performed by AEB 112 shown in FIG. 1.

At step 300, vehicle status is monitored. For example, in the embodiment shown in FIG. 1 the AEB module 112 receives input from the vehicle state detector 111. The vehicle status may be determined based on one or more sensor inputs provided by—for example—accelerometer 102 and/or steering input 106. These inputs may be utilized by the vehicle state detector 111 to calculate one or more attributes of vehicle state, such as radius of curvature (ROC), steering angle change—both calculated based on steering angle inputs, and/or yaw rate—calculated based on accelerometer inputs. The AEB module 112 may utilize these attributes to determine the vehicle status. In some embodiments, the AEB module 112 receives the sensor inputs directly and utilizes the sensor inputs to calculate the vehicle status. In other embodiments, the vehicle state detector 111 receives the inputs from the sensors and utilizes them to calculate one or more attributes, wherein the attributes are provided to the AEB module 112 for analysis.

At step 302 a U-turn is detected based on the monitored vehicle status. For example, in some embodiments one or more of the attributes are compared to threshold values. For example, in some embodiments a U-turn event is detected if the monitored yaw rate exceeds yaw rate threshold. In some embodiments, a U-turn event is detected if the monitored ROC exceeds a ROC threshold or if the monitored steering angle exceeds a steering angle threshold. In some embodiments, a combination of attributes are utilized to detect a U-turn event. For example, in some embodiments both the monitored yaw rate and monitored ROC must exceed threshold values. In some embodiments, AEB module 112 applies a filtering strategy (not shown) to the measured yaw rate. In some embodiments, the filtering strategy may include applying a low-pass filter to the measured yaw rate (i.e., filtering out high frequency changes in yaw rate). In some embodiments, the low-pass filter filters out short duration or high frequency changes in yaw rate—thus a quick turn of the steering wheel that generates a high yaw rate does not necessarily trigger detection of a U-turn event. In some embodiments, the filtering strategy may also include—either alone or in combination with the low-pass filter—an event filter. In some embodiments, the event filter requires the yaw rate to remain high (i.e., for a sustained period of time to initiate detection of a U-turn event. In other embodiments, additional inputs may be utilized in combination with the monitored vehicle status. For example, one or more of yaw rate, ROC and/or steering angle may be utilized in combination with vehicle speed—wherein U-turns are assumed to be executed only when the vehicle is less than a threshold speed. In this way, a combination of inputs may be utilized to determine whether the vehicle is experiencing a U-turn event. If no U-turn event is detected at step 302, then monitoring of vehicle status continues at step 300. If a U-turn event is detected, then the process continues at step 304.

At step 304, the AEB algorithm utilized by the AEB module 112 (as shown in FIG. 1) is modified based on the detected U-turn status to avoid false AEB intervention. In some embodiments, the AEB algorithm applied during normal operation utilizes a combination of host speed, longitudinal range to target, time-to-collision (TTC), lateral position of the target, and/or lateral speed/direction of the target. In some embodiments, host speed and longitudinal range are utilized to calculate a TTC with respect to a given target and lateral range and lateral speed/direction of the target are utilized to calculate a lateral offset of the target relative to the path of the host vehicle. In some embodiments, the AEB algorithm implemented by the AEB module 112—during normal operation—compares the calculated TTC value to a TTC threshold, wherein a threat is identified if the calculated TTC is less than the TTC threshold. In some embodiments, the TTC threshold is varied with speed of the vehicle, but for purposes of this discussions of modifying the AEB algorithm—which may include modifications of the TTC threshold—the TTC threshold is modified relative to whatever TTC threshold is utilized during normal operation. Likewise, in some embodiments the AEB algorithm—again during normal operation—compares the lateral offset of the target to a lateral offset threshold to determine whether the target is likely within the future path of the vehicle. In some embodiments, modifying the AEB algorithm includes modifying the lateral offset threshold, either alone or in combination with the modification of the TTC threshold. In some embodiments, during normal operation an AEB event (emergency braking event) is initiated in response to both the calculated TTC and the lateral offset being less than the respective threshold values, as shown in Table 1.

TABLE 1

| Decision Table | | TTC < TTC THRESHOLD | |
|---|---|---|---|
| | | YES | NO |
| Lateral Offset < Lateral Offset Threshold | Yes | Collision Detected | No Collision Detected |
| | No | No Collision Detected | No Collision Detected |

In some embodiments, other received parameters may be taken into account as part of the AEB algorithm. For example, in some embodiments the AEB algorithm may utilize the radius of curvature (ROC) of the host vehicle. For example, a detected ROC of the host vehicle may be accounted for in calculating the lateral offset and/or TTC with respect to a given target. For example, the lateral offset calculation may take into account the ROC of the host vehicle.

In some embodiments, modification of the AEB algorithm based on the detected U-turn status at step 304 includes modifying one or both of the TTC threshold and Lateral Offset Threshold. For example, in some embodiments modification of the AEB algorithm includes decreasing the TTC threshold compared to the calculated TTC— thereby requiring a threat to be closer to the host vehicle to activate the AEB module. In some embodiments, modification of the AEB algorithm may include decreasing the lateral offset threshold compared to the lateral offset. In some embodiments, decreasing the lateral offset threshold decreases errors associated with calculating lateral offset while the host vehicle is engaged in a high yaw rate turn. In other embodiments, the AEB algorithm may be modified in other ways to decrease the detection of false positive AEB events during detected U-turns.

At step 306, the modified AEB algorithm is applied to detected targets. In this way, the host vehicle still detects targets including vulnerable road users (VRUs) and provides AEB to prevent collisions with detected targets but prevents false positive events that typically characterize AEB algorithms during U-turn events.

Figure 4:
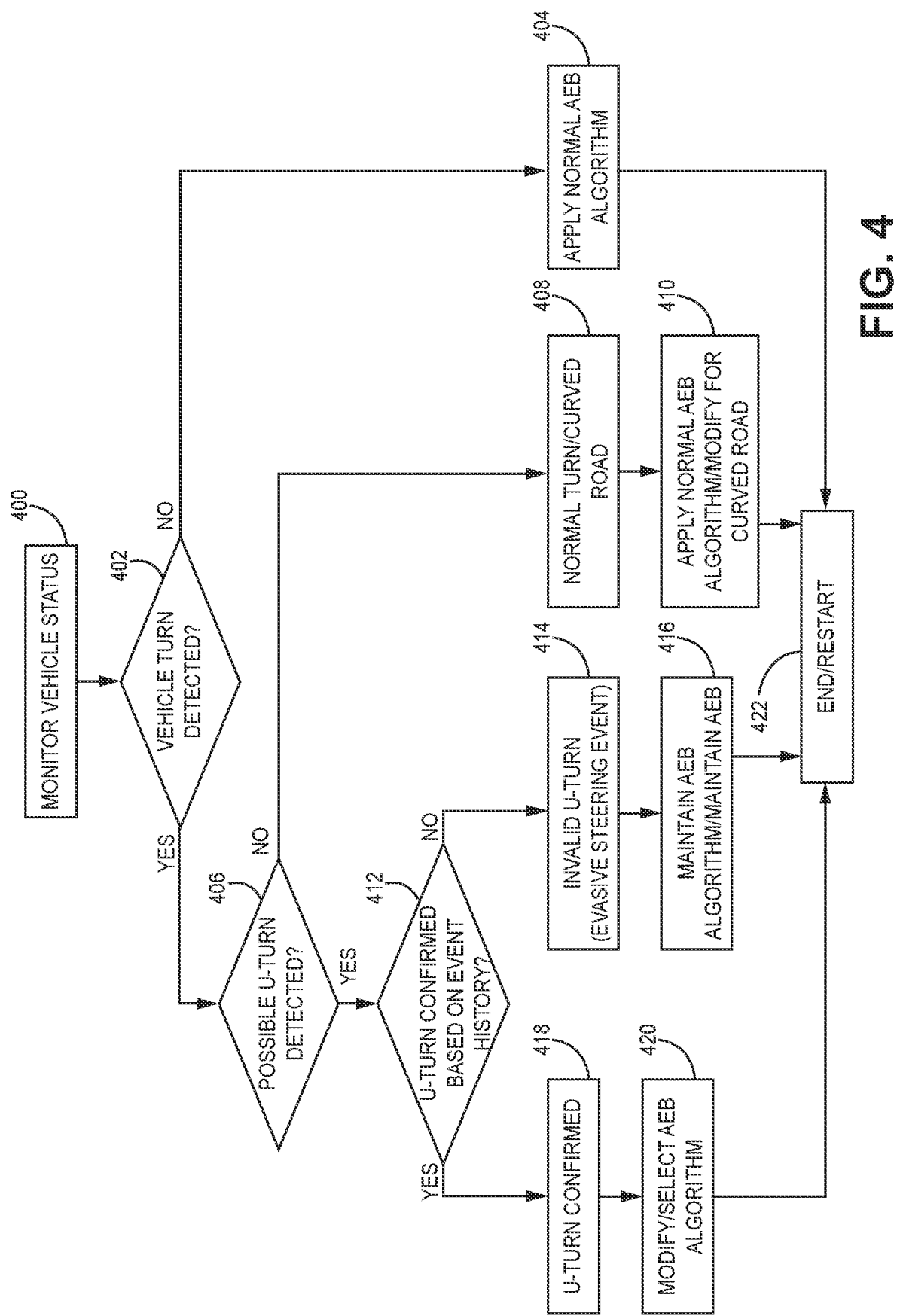
FIG. 4 is a flowchart illustrating selection of a vulnerable road user (VRU)/automatic emergency braking (AEB) algorithm in response to various events according to some embodiments.

FIG. 4 is a flowchart illustrating selection of a vulnerable road user (VRU)/automatic emergency braking (AEB) algorithm in response to various events according to some embodiments. In contrast with the flowchart illustrated in FIG. 3, the method illustrated by FIG. 4 differentiates between U-turns in which it is desirable to modify the AEB algorithm to prevent false positives and evasive steering events in which it is desirable to maintain the AEB algorithm operating in the unmodified or normal state. In general, the embodiment shown in FIG. 4 uses event history to determine whether the conditions that triggered detection of a U-turn event (e.g., high yaw rate) were the result of an evasive steering event rather than a U-turn event.

In some embodiments, at step 400 the vehicle status is monitored. As described with respect to FIG. 3, above, in some embodiments the AEB module 112 receives input from the vehicle state detector 111. The vehicle status may be determined based on one or more sensor inputs provided by—for example—accelerometer 102 and/or steering input 106. These inputs may be utilized by the vehicle state detector 111 to calculate one or more attributes of vehicle state, such as radius of curvature (ROC), steering angle change—both calculated based on steering angle inputs, and/or yaw rate—calculated based on accelerometer inputs. The AEB module 112 may utilize these attributes to determine the vehicle status, including whether a vehicle turn is detected. In some embodiments, the AEB module 112 receives the sensor inputs directly and utilizes the sensor inputs to calculate the vehicle status. In other embodiments, the vehicle state detector 111 receives the inputs from the sensors and utilizes them to calculate one or more attributes, wherein the attributes are provided to the AEB module 112 for analysis.

In contrast with the embodiment described in FIG. 3, at step 402 the monitored vehicle status is utilized to detect whether the vehicle is turning. If at step 402 it is determined that the vehicle is not turning (e.g., ROC, yaw rate, or steering angle are below threshold values), then at step 404 the AEB module 112 applies a conventional or unmodified AEB algorithm. For example, the AEB algorithm may utilize the threshold comparisons shown in Table 1. If at step 402 the vehicle attributes indicate that the vehicle is turning, then at step 406 a determination is made regarding the turn is a possible U-turn.

At step 406, a determination is made whether the turn detected at step 402 is a possible U-turn event. In some embodiments, the determination made at step 406 includes utilizing one or more of the attributes provided to the AEB module 112 (e.g., ROC, yaw rate, steering angle, etc.). In some embodiments, this includes comparing one or more of the attributes to threshold values to determine whether the vehicle is initiating a U-turn. In some embodiments, if at step 406 it is determined that the vehicle is not initiating a U-turn event, then at step 408 it is determined that the vehicle is initiating a normal turn. In some embodiments, the AEB module 112 remains unmodified and the process ends (and then restarts at step 400). In some embodiments, in response to a determination that the vehicle is turning at step 406 and 408, the AEB algorithm is modified at step 410 to take into account one or more attributes of the turning vehicle. For example, in some embodiments the AEB algorithm may be modified based on the ROC of the host vehicle to modify the lateral offset threshold (or other parameters). If a possible U-turn is detected at step 406, then at step 412 event history is utilized to distinguish between U-turns and evasive steering maneuvers. In some embodiments, event history is utilized to distinguish between U-turns and evasive steering maneuvers. For example, an evasive steering maneuver is initiated to avoid collision with a target, and typically includes activation of the autonomous emergency braking (AEB) system prior to the vehicle turning. With reference to FIG. 2B, an AEB event may be initiated point 'A', following a determination that the host vehicle will collide with the VRU target 212. However, the attributes such as yaw rate, ROC, and/or steering angle will not result in detection of a possible U-turn event until point 13', subsequent in time to Point 'A'. In this way, a preceding AEB event may be utilized to distinguish between a U-turn event and an evasive steering maneuver. In some embodiments, the stored event (e.g., AEB event, evasive steering event) must have occurred within a defined threshold (e.g., a few seconds) to be considered relevant to the determination at step 412. In other embodiments, if the AEB event and corresponding evasive steering event are still engaged, then the current event cannot be identified as a U-turn event. In some embodiments, the predicted collision and/or initiation of the AEB module is stored in the event history of the vehicle (e.g. memory 114 shown in FIG. 1). In some embodiments, if the event history indicates that evasive steering/braking/collision avoidance preceded the attributes (e.g., yaw rate, ROC, steering angle, etc.) indicative of a U-turn, then at step 414 the steering event is identified as something other than a U-turn event, such as an evasive steering event. In some embodiments, if identified as an evasive steering event, then no modification are made to the AEB algorithm. In some embodiments, this may further include making no changes to the status of autonomous emergency braking previously initiated (i.e., AEB braking is maintained as desired through the evasive steering event).

If at step 412 the event history confirms that the turn is a U-turn, then at step 418 the turn is identified as a U-turn and at step 420 the AEB algorithm is modified. As described above with respect to step 304, modification of the AEB algorithm may include modifying one or both of the TTC threshold and Lateral Offset Threshold. For example, in some embodiments modification of the AEB algorithm includes decreasing the TTC threshold compared to the calculated TTC— thereby requiring a threat to be closer to the host vehicle to activate the AEB module. In some embodiments, modification of the AEB algorithm may include decreasing the lateral offset threshold compared to the lateral offset. In some embodiments, decreasing the lateral offset threshold decreases errors associated with calculating lateral offset while the host vehicle is engaged in a high yaw rate turn. In other embodiments, the AEB algorithm may be modified in other ways to decrease the detection of false positive AEB events during detected U-turns.

Although the steps illustrated in FIG. 4 have been assigned numerals, this does not imply that the steps are implemented in that order. For example, in some embodiments event history main be reviewed prior to utilizing yaw rate, ROC and/or steering angle to detect possible U-turn events. In other embodiments, one or more of these steps may be performed relatively simultaneously to determine the state of the vehicle.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

According to one aspect, a method of implementing autonomous emergency braking (AEB) for advanced driver-assistance systems (ADAS) includes receiving one or more first inputs and identifying one or more targets external to a host vehicle based on the one or more first inputs. The method further includes receiving one or more second inputs related to a turning status of the host vehicle and detecting a U-turn state associated with the host vehicle based on the one or more second inputs. The AEB algorithm is modified in response to the detected U-turn state, wherein the AEB algorithm initiates an AEB event as necessary to avoid collisions with the one or more identified targets.

The method of the preceding paragraph can optionally include, additionally and/or alternatively any, one or more of the following features, configurations and/or additional components.

For example, in some embodiments receiving one or more second inputs related to a turning status of the host vehicle may include receiving at least one of an accelerometer and a yaw rate of the host vehicle.

In some embodiments, receiving one or more second inputs related to a turning status of the host vehicle may include receiving a steering input, wherein the steering input includes at least one of a steering angle and a steering rate.

In some embodiments, the method may further include calculating a time to collision (TTC) value with respect to each identified target, wherein the AEB algorithm initiates AEB in response to the calculated TTC value being less than a TTC threshold, wherein modifying the AEB algorithm includes decreasing the TTC threshold.

In some embodiments, the method may further include calculating a lateral offset value with respect to each identified target, wherein the AEB algorithm initiates AEB in response to the calculated lateral offset value being less than a lateral offset threshold, wherein modifying the AEB algorithm includes decreasing the lateral offset threshold.

In some embodiments, detecting a U-turn state may include differentiating between a U-turn state and an evasive steering state, wherein the AEB algorithm is only modified in response to a detected U-turn state.

In some embodiments, differentiating between a U-turn state and an evasive steering state may include utilizing stored event history, wherein an evasive steering state is identified if an AEB event was initiated prior to the detected U-turn state.

According to another aspect, a method of implementing autonomous emergency braking (AEB) for advanced driver-assistance systems (ADAS) includes identifying one or more targets external to a host vehicle and detecting a vehicle turn state of the host vehicle based on one or more inputs. The method may further include selecting an Autonomous Emergency Braking (AEB) algorithm to apply based on the detected vehicle turn state, wherein the AEB algorithm is utilized to initiate an AEB event to avoid collision with the identified target.

The method of the preceding paragraph can optionally include, additionally and/or alternatively any, one or more of the following features, configurations and/or additional components.

For example, in some embodiments detecting a turn state of the host vehicle may include distinguishing between a U-turn state and a normal turning state, wherein a first AEB algorithm is utilized for a normal turning state, and a second AEB algorithm is utilized for a U-turn state.

In some embodiments, detecting a turn state of the host vehicle based on one or more inputs may include utilizing one or more of yaw rate of the host vehicle, steering angle, steering rate, and radius of curvature.

In some embodiments, a U-turn state is identified when the yaw rate exceeds a first threshold.

In some embodiments, the first AEB algorithm may initiate AEB if a calculated time to collision (TTC) to an identified target is less than a first TTC threshold and wherein the second AEB algorithm may initiate AEB if a calculated TTC to an identified target is less than a second TTC threshold, wherein the second TTC threshold is less than the first TTC threshold.

In some embodiments, the method may further include storing vehicle event history, wherein detecting a vehicle turn state may be based, at least in part, on the stored vehicle event history.

In some embodiments, the vehicle event history may be utilized to distinguish between a U-turn state and evasive steering state.

In some embodiments, the vehicle event history may include AEB events, wherein if an AEB event is initialized prior to the one or more inputs indicating a U-turn state, then the turn state is identified as an evasive steering state.

In some embodiments, the first AEB algorithm may be utilized in response to a detected evasive steering state.

According to another aspect, an advanced driver-assistance system (ADAS) includes one or more first sensors configured to generate first inputs related to targets sensed external to a host vehicle and one or more second sensors configured to generate second inputs related to a turn state of the host vehicle. The ADAS may further include a controller configured to receive the first inputs from the one or more first sensors and the second inputs from the one or more second sensors, wherein the controller is configured to detect targets based on the first inputs received from the one or more first sensors and detects the turn state of the host vehicle based on the second inputs, wherein the controller utilizes an autonomous emergency braking (AEB) algorithm to trigger AEB events to avoid collisions with the detected targets, wherein the controller modifies the AEB algorithm based on detected turn state of the host vehicle.

The system of the preceding paragraph can optionally include, additionally and/or alternatively any, one or more of the following features, configurations and/or additional components.

For example, in some embodiments the controller may calculate a time-to-collision (TTC) with respect to each detected target, wherein the AEB algorithm initiates an AEB event if the calculated TTC is less than a TTC threshold.

In some embodiments, the controller may modify the AEB algorithm by decreasing the TTC threshold in response to a detected turn state indicating the host vehicle is performing a U-turn.

In some embodiments, the controller may be configured to store and retrieve event history, wherein the controller utilizes the event history to distinguish between U-turn state and evasive steering state based on the event history.

The invention claimed is:

1. A method of implementing autonomous emergency braking (AEB) for advanced driver-assistance systems (ADAS), the method comprising: receiving one or more first inputs; identifying one or more targets external to a host vehicle based on the one or more first inputs; receiving one or more second inputs related to a turning status of the host vehicle; detecting a U-turn state associated with the host vehicle based on the one or more second inputs; calculating a time to collision (TTC) value with respect to each identified target, wherein an AEB algorithm initiates an AEB event if the calculated TTC is less than a TTC threshold; and modifying the AEB algorithm by decreasing the TTC threshold in response to the detected U-turn state, wherein the AEB algorithm initiates an AEB event as necessary to avoid collisions with the one or more identified targets.

2. The method of claim 1, wherein receiving the one or more second inputs related to the turning status of the host vehicle includes receiving at least one of an accelerometer and a yaw rate of the host vehicle.

3. The method of claim 1, wherein receiving the one or more second inputs related to the turning status of the host vehicle includes receiving a steering input, wherein the steering input includes at least one of a steering angle and a steering rate.

4. The method of claim 1, further including: calculating a lateral offset value with respect to each identified target, wherein the AEB algorithm initiates AEB in response to the calculated lateral offset value being less than a lateral offset threshold, wherein modifying the AEB algorithm includes decreasing the lateral offset threshold.

5. The method of claim 1, wherein detecting the U-turn state includes differentiating between the U-turn state and an evasive steering state, wherein the AEB algorithm is only modified in response to the detected U-turn state.

6. The method of claim 5, wherein differentiating between the U-turn state and the evasive steering state includes utilizing stored event history, wherein the evasive steering state is identified if an AEB event was initiated prior to the detected U-turn state.

7. A method of implementing autonomous emergency braking (AEB) for advanced driver-assistance systems (ADAS), the method comprising: identifying one or more targets external to a host vehicle; detecting a vehicle turn state of the host vehicle based on one or more inputs; and selecting an Autonomous Emergency Braking (AEB) algorithm to apply based on the detected vehicle turn state, wherein the AEB algorithm is utilized to initiate an AEB event to avoid collision with the identified target, wherein detecting the vehicle turn state of the host vehicle includes distinguishing between a U-turn state and a normal turning state, wherein a first AEB algorithm is utilized for the normal turning state, and a second AEB algorithm is utilized for the U-turn state, wherein the vehicle event history is utilized to distinguish between the U-turn state and an evasive steering state.

8. The method of claim 7, wherein detecting the vehicle turn state of the host vehicle based on the one or more inputs includes utilizing one or more of yaw rate of the host vehicle, steering angle, steering rate, and radius of curvature.

9. The method of claim 8, wherein the U-turn state is identified when the yaw rate exceeds a first threshold.

10. The method of claim 7, wherein the first AEB algorithm initiates AEB if a calculated time to collision (TTC) to an identified target is less than a first TTC threshold and wherein the second AEB algorithm initiates AEB if a calculated TTC to the identified target is less than a second TTC threshold, wherein the second TTC threshold is less than the first TTC threshold.

11. The method of claim 7, further including storing vehicle event history, wherein detecting the vehicle turn state is further based on the stored vehicle event history.

12. The method of claim 7, wherein the vehicle event history includes AEB events, wherein if an AEB event is initialized prior to the one or more inputs indicating the U-turn state, then the turn state is identified as the evasive steering state.

13. The method of claim 7, wherein the first AEB algorithm is utilized in response to the detected evasive steering state.

14. An advanced driver-assistance system (ADAS) comprising: one or more first sensors configured to generate first inputs related to targets sensed external to a host vehicle; one or more second sensors configured to generate second inputs related to a turn state of the host vehicle; and a controller configured to receive the first inputs from the one or more first sensors and the second inputs from the one or more second sensors, wherein the controller is configured to detect targets based on the first inputs received from the one or more first sensors and detects the turn state of the host vehicle based on the second inputs, wherein the controller utilizes an autonomous emergency braking (AEB) algorithm to trigger AEB events to avoid collisions with the detected targets, wherein the controller modifies the AEB algorithm based on detected turn state of the host vehicle, wherein the controller calculates time-to-collision (TTC) with respect to each detected target, wherein the AEB algorithm initiates an AEB event if the calculated TTC is less than a TTC threshold, and wherein the controller modifies the AEB algorithm by decreasing the TTC threshold in response to the detected turn state indicating the host vehicle is performing a U-turn.

15. The ADAS of claim 14, wherein the controller is further configured to store and retrieve an event history, wherein the controller utilizes the event history to distinguish between a U-turn state and an evasive steering state based on the event history.

* * * * *